US011281610B2

(12) United States Patent
Gong et al.

(10) Patent No.: US 11,281,610 B2
(45) Date of Patent: Mar. 22, 2022

(54) METHOD, DEVICE, AND COMPUTER PROGRAM PRODUCT FOR MANAGING DATA TRANSFER

(71) Applicant: EMC IP Holding Company LLC, Hopkinton, MA (US)

(72) Inventors: Shuguang Gong, Beijing (CN); Long Wang, Beijing (CN); Tao Chen, Beijing (CN); Bing Liu, Tianjin (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/064,763

(22) Filed: Oct. 7, 2020

(65) Prior Publication Data

US 2022/0043765 A1 Feb. 10, 2022

(30) Foreign Application Priority Data

Aug. 7, 2020 (CN) .......................... 202010788335.X

(51) Int. Cl.
*G06F 13/28* (2006.01)
(52) U.S. Cl.
CPC .................................... *G06F 13/28* (2013.01)
(58) Field of Classification Search
None
See application file for complete search history.

(56) References Cited

U.S. PATENT DOCUMENTS

| 8,984,179 | B1* | 3/2015 | Cardona ................. G06F 13/28 710/22 |
| 10,789,003 | B1* | 9/2020 | Sun ...................... G06F 12/0238 |
| 2020/0356292 | A1* | 11/2020 | Ippatapu ............. G06F 11/3034 |

* cited by examiner

*Primary Examiner* — Farley Abad
*Assistant Examiner* — Dayton Lewis-Taylor
(74) *Attorney, Agent, or Firm* — Womble Bond Dickinson (US) LLP

(57) ABSTRACT

Embodiments of the present disclosure relate to a method, a device, and a computer program product for managing data transfer. A method for managing data transfer is provided, including: if determining that a request to transfer a data block between a memory and a persistent memory of a data storage system is received, obtaining a utilization rate of a central processing unit of the data storage system; and determining, from a first transfer technology and a second transfer technology and at least based on the utilization rate of the central processing unit, a target transfer technology for transferring a data block between the memory and the persistent memory, the first transfer technology transferring data through direct access to the memory, and the second transfer technology transferring data through the central processing unit. Therefore, the embodiments of the present disclosure can improve the data transfer performance of the storage system.

14 Claims, 6 Drawing Sheets

METHOD, DEVICE, AND COMPUTER PROGRAM PRODUCT FOR MANAGING DATA TRANSFER

CROSS-REFERENCE TO RELATED APPLICATION

This patent application claims priority, under 35 U.S.C. § 119, of Chinese Patent Application No. 202010788335.X, filed Aug. 7, 2020, which is incorporated by reference in its entirety.

TECHNICAL FIELD

Embodiments of the present disclosure generally relate to the field of storage, and more particularly, to a method, an electronic device, and a computer program product for managing data transfer.

BACKGROUND

In the field of data storage, some data storage systems may involve a large amount of data transfer. For example, in a storage system for data backup, data from various servers or client terminals needs to be processed and then stored in a storage device. In order to avoid the loss of important data, intermediate data generated during data processing can be stored in a non-volatile storage device.

However, for scenarios involving a large amount of data transfer, the load of a central processing unit (CPU) may be too heavy. This is because the CPU has to wait for the input/output (I/O) on the storage device to finish before performing other operations, which will cause the CPU to stall, and in turn, lead to a decrease in system performance.

SUMMARY OF THE INVENTION

A method, a device, and a computer program product for managing data transfer are provided in embodiments of the present disclosure.

In a first aspect of the present disclosure, a method for managing data transfer is provided. The method includes: if determining that a request to transfer a data block between a memory and a persistent memory (PMEM) of a data storage system is received, obtaining a utilization rate of a central processing unit of the data storage system; and determining, from a first transfer technology and a second transfer technology and at least based on the utilization rate of the central processing unit, a target transfer technology for transferring a data block between the memory and the persistent memory, the first transfer technology transferring data through direct access to the memory, and the second transfer technology transferring data through the central processing unit.

In a second aspect of the present disclosure, an electronic device is provided. The device includes: at least one processing unit; and at least one memory, wherein the at least one memory is coupled to the at least one processing unit and stores instructions for execution by the at least one processing unit, and the instructions, when executed by the at least one processing unit, cause the device to execute actions including: if determining that a request to transfer a data block between a memory and a persistent memory of a data storage system is received, obtaining a utilization rate of a central processing unit of the data storage system; and determining, from a first transfer technology and a second transfer technology and at least based on the utilization rate of the central processing unit, a target transfer technology for transferring a data block between the memory and the persistent memory, the first transfer technology transferring data through direct access to the memory, and the second transfer technology transferring data through the central processing unit.

In a third aspect of the present disclosure, a computer program product is provided. The computer program product is tangibly stored in a non-transitory computer storage medium and includes machine-executable instructions. The machine-executable instructions, when executed by a device, cause the device to execute any step of the method described according to the first aspect of the present disclosure.

The summary is provided to introduce the choice of concepts in a simplified form, which will be further described in the following Detailed Description. The Summary is neither intended to identify important features or essential features of the present disclosure, nor intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same components.

In the accompanying drawings, the same or corresponding numerals represent the same or corresponding parts.

DETAILED DESCRIPTION

Figure 1:
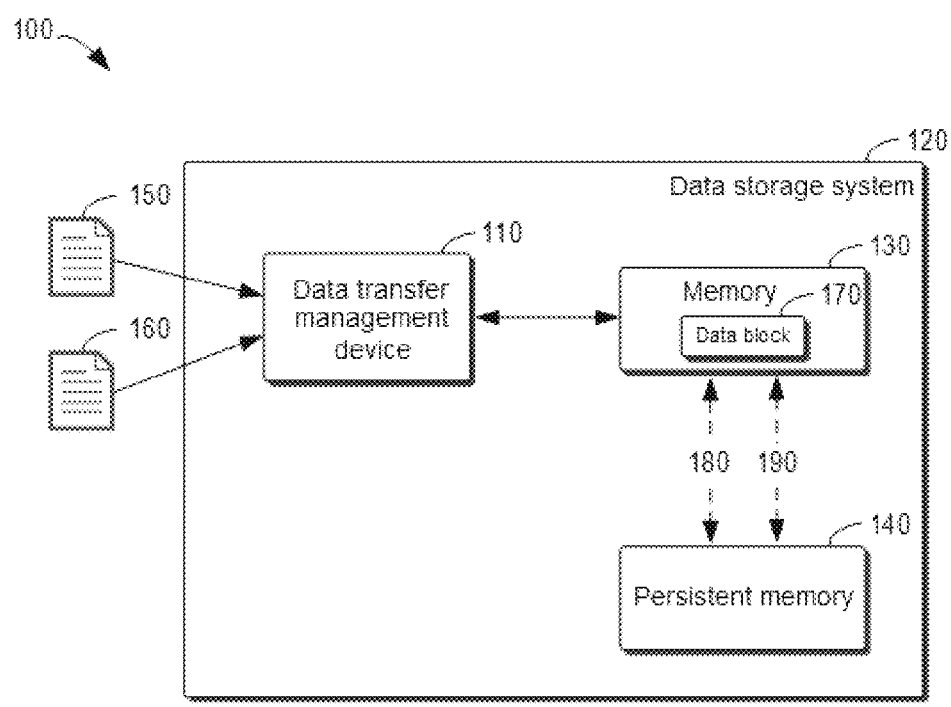
FIG. 1 is a block diagram of an example data transfer management system in which embodiments of the present disclosure can be implemented.

Preferred embodiments of the present disclosure will be described in more detail below with reference to the accompanying drawings. Although the preferred embodiments of the present disclosure are shown in the accompanying drawings, it should be understood that the present disclosure can be implemented in various forms and should not be limited by the embodiments set forth herein. Rather, these embodiments are provided to make the present disclosure more thorough and complete and to fully convey the scope of the present disclosure to those skilled in the art.

The term "include" and its variants as used herein indicate open-ended inclusion, i.e., "including, but not limited to." Unless specifically stated, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As mentioned above, some data storage systems may involve a large amount of data transfer. For example, in a storage system for data backup, data from various servers or client terminals needs to be processed and then stored in a storage device. To avoid the loss of important data, intermediate data generated during data processing can be stored in a non-volatile storage device. Non-volatile storage devices can realize data protection and system recovery in the event of power outage, such as a power failure event.

Some data storage systems use a persistent memory as a non-volatile storage device. Persistent memory combines the advantages of dynamic random access memory (DRAM) and NAND flash memory, and can achieve data transfer with low delay and high throughput. In conventional computer systems, PMEM is widely used as a cache for hot data or critical data protection. Due to these advantages, PMEM can replace conventional non-volatile memory (NVRAM) cards and serve as a non-volatile storage device in a storage system.

However, at runtime, a persistent memory, like ordinary DRAM, transfers data with its software stack using the central processing unit (CPU) memory replication technology. This transfer technology requires the participation of a CPU. In computing systems or storage systems that do not involve a large amount of data transfer, using the CPU memory replication technology will not cause serious performance problems. However, for scenarios involving a large amount of data transfer, the load of the CPU may be too heavy, this is because the CPU has to wait for the I/O on the persistent memory to finish before performing other operations. This will cause the CPU to stall, which in turn leads to a decrease in system performance.

There is another transfer technology-input/output acceleration technology direct memory access (I/O AT DMA) technology, which allows direct access to the memory without participation of the CPU, so it can offload memory replication operations, thereby reducing the load on the CPU. However, for relatively small data blocks, this transfer technology may increase the delay of data transfer and reduce the throughput of data transfer.

Embodiments of the present disclosure provide a solution for managing data transfer to solve one or more of the above problems and other potential problems. The solution determines a target transfer technology for transferring a data block between a memory and a persistent memory at least according to an utilization rate of a central processing unit in a data storage system. In this way, the CPU load and data transfer delay can be balanced, thereby improving the data transfer performance of the storage system.

FIG. 1 is a block diagram of example data transfer management system 100 in which embodiments of the present disclosure can be implemented. As shown in FIG. 1, data transfer management system 100 includes data transfer management device 110, and memory 120 and persistent memory 130 in data storage system 120. Data transfer management device 110 can receive request 150 to transfer data block 170 between memory 130 and persistent memory 140, and determine, from first transfer technology 180 and second transfer technology 190 and at least according to utilization rate 160 of a central processing unit of data storage system 120, a target transfer technology for transferring data block 170 between memory 130 and persistent memory 140. Various methods according to the embodiments of the present disclosure may be implemented, for example, at an electronic device of data transfer management device 110.

Data transfer management device 110 may be, for example, the central processing unit per se of data storage system 120, or may be, for example, a computer, a virtual machine, or a server. Data transfer management device 110 and memory 120 may be connected via a system bus or through a network, such as the Internet, an intranet, or the like. The present disclosure is not limited in this regard.

It should be understood that the structure of data transfer management system 100 is described for illustrative purposes only, and does not imply any limitation to the scope of the present disclosure. For example, the embodiments of the present disclosure can also be applied to a system different from data transfer management system 100. It should be understood that the specific number of the above devices is given for illustrative purposes only, and does not imply any limitation to the scope of the present disclosure. For example, the embodiments of the present disclosure may also be applied to more memories, persistent memories, and the like.

Figure 2:
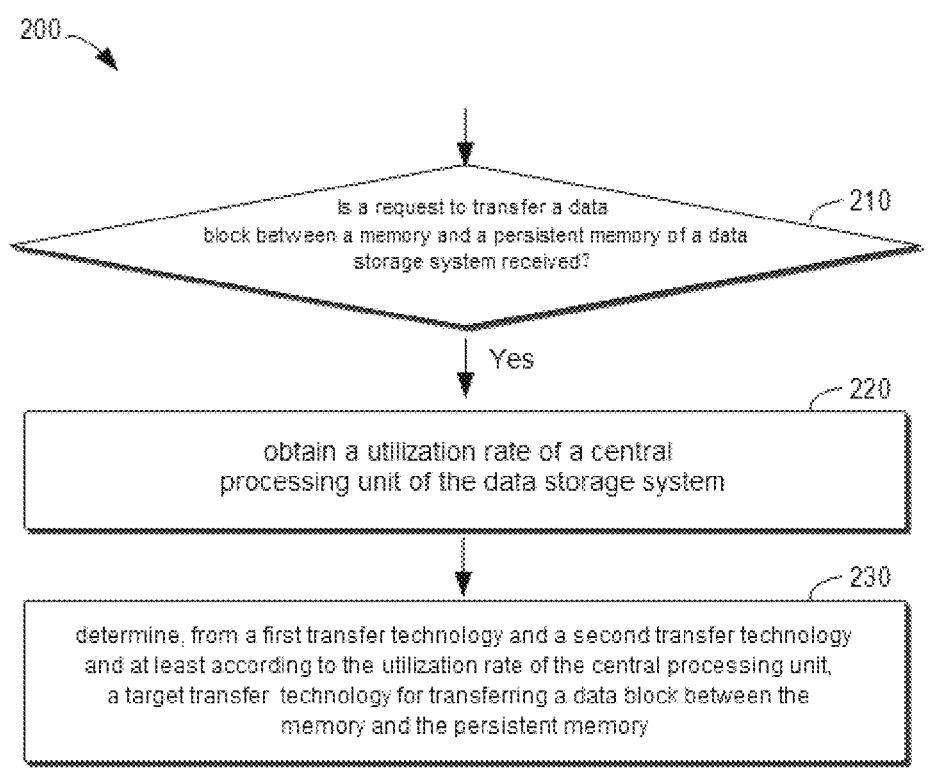
FIG. 2 is a flowchart of an example method for managing data transfer according to an embodiment of the present disclosure.

FIG. 2 is a flowchart of example method 200 for managing data transfer according to an embodiment of the present disclosure. For example, method 200 may be performed by data transfer management device 110 shown in FIG. 1. It should be understood that method 200 may also be performed by other devices, and the scope of the present disclosure is not limited in this regard. It should also be understood that method 200 may also include additional actions not shown and/or omit the actions shown, and the scope of the present disclosure is not limited in this regard.

At 210, data transfer management device 110 determines whether request 150 to transfer data block 170 between memory 130 and persistent memory 140 of data storage system 120 is received.

In some embodiments, data storage system 120 may be a data backup system. Additionally, in some embodiments, in order to perform data backup more efficiently and save storage space, it is usually necessary to delete duplicate data before performing data backup. Data storage system 120 may also be a storage system for deduplication. Data transfer management device 110 may determine whether request 150 to transfer data block 170 between memory 130 and persistent memory 140 of the storage system for deduplication is received.

Figure 3:
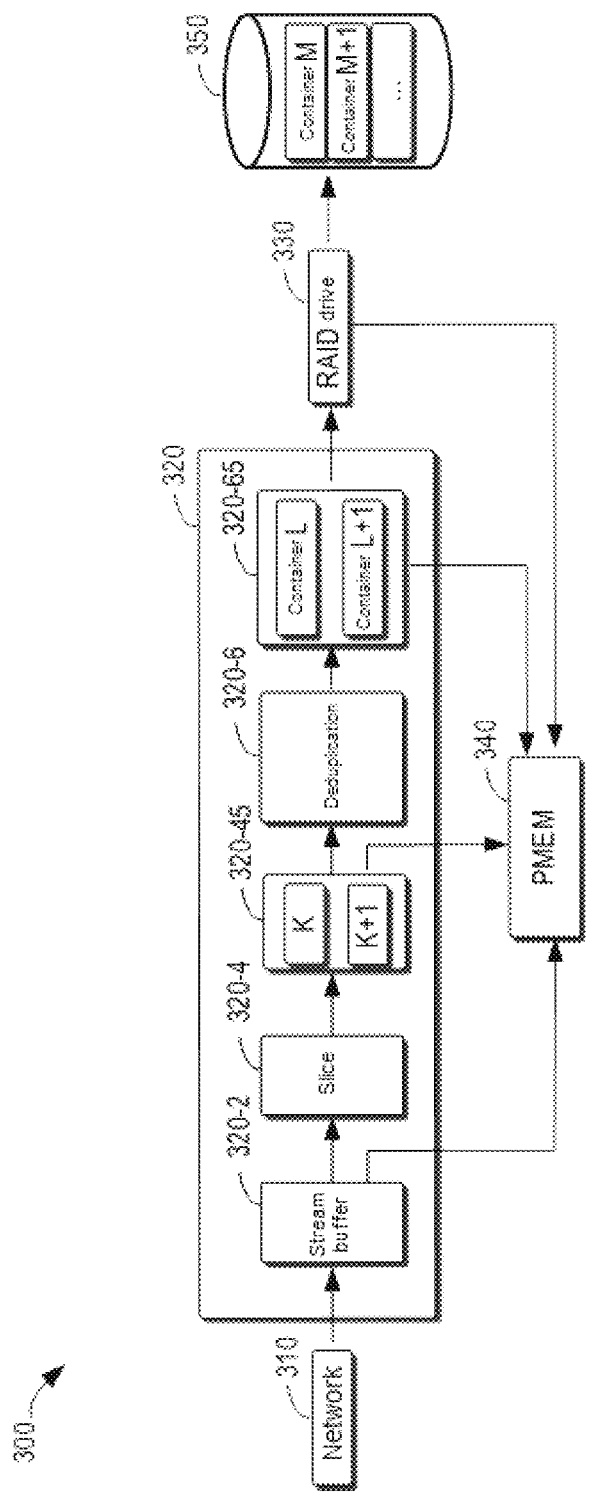
FIG. 3 illustrates a schematic diagram of a process of deduplication performed by a data storage system according to an embodiment of the present disclosure.

In order to more clearly show the necessity of the solution of the embodiment of the present disclosure, the following describes the process of data deduplication involving a large amount of data transfer with reference to FIG. 3.

FIG. 3 illustrates schematic diagram 300 of a process of deduplication performed by a data storage system according to an embodiment of the present disclosure. As shown in FIG. 3, the storage system for deduplication receives streaming data from network 310, performs deduplication process 320 on the received streaming data, and then stores data after deduplication to external storage device 350 such as a disk, a solid state drive (SSD), and the like.

As shown in FIG. 3, deduplication process 320 usually includes several fine-grained stages, such as stream buffer 320-2, slice 320-4, and deduplication 320-6. In order to ensure data integrity and reduce response delay, important data at various stages, such as data 320-45 after slicing and data 320-65 after deduplication, and I/O requests for redundant array of independent disks (RAID) drive 330 need to be stored in persistent memory 340. Generally, in a storage system for data deduplication, hundreds of streams need to be processed in parallel, and there is a large amount of bulk data writing. Therefore, a storage system for data deduplication involves a large amount of data transfer, and requires a high throughput for persistent memory.

Table 1 below shows the throughput requirements of storage systems for deduplication with different capacities for persistent memory.

TABLE 1

Throughput requirements of different storage systems for persistent memory

| Storage System | Storage Capacity | Persistent memory write throughput (MB/sec) | |
|---|---|---|---|
| | | No deduplication | After partial deduplication |
| Storage system 1 | 288 TB | 1130 | 154 |
| Storage system 2 | 768 TB | 2104 | 310 |
| Storage system 3 | 1.5 PB | 2424 | 515 |

It can be seen from Table 1 that in a storage system for data deduplication, a large amount of data needs to be transferred between memory 130 and persistent memory 140.

Now returning to FIG. 2, if data transfer management device 110 determines that request 150 is received, at 220, data transfer management device 110 obtains utilization rate 160 of the CPU of data storage system 120. In some embodiments, data transfer management device 110 may obtain CPU utilization rate 160 through the system bus. It should be readily understood that when CPU utilization rate 160 is high, it indicates that the CPU load is heavy, and it is necessary to determine whether to offload the CPU to reduce the possibility of CPU stalls. When CPU utilization rate 160 is low, there is no need to offload the CPU.

At 230, data transfer management device 110 determines, from first transfer technology 180 and second transfer technology 190 and at least according to utilization rate 160 of the central processing unit, a target transfer technology for transferring data block 170 between memory 130 and persistent memory 140, first transfer technology 180 transferring data through direct access to the memory, and second transfer technology 190 transferring data through the central processing unit.

In some embodiments, first transfer technology 180 is an I/O AT DMA technology, and second transfer technology 190 is a CPU memory replication technology. In some embodiments, data transfer management device 110 may determine whether utilization rate 160 of the central processing unit is lower than a threshold utilization rate. If data transfer management device 110 determines that utilization rate 160 of the central processing unit is lower than the threshold utilization rate, data transfer management device 110 may determine to use the CPU memory replication technology to transfer data. If data transfer management device 110 determines that utilization rate 160 of the central processing unit is higher than or equal to the threshold utilization rate, data transfer management device 110 may obtain the size of data block 170 to be transferred, and determine the target transfer technology according to the size of data block 170, such as determining whether to use the CPU memory replication technology or the I/O AT DMA technology to transfer data. Additionally, in some embodiments, the threshold utilization rate may be, for example, 80%. How to determine the target transfer technology according to the size of the data block will be described in detail with respect to FIG. 4 below.

Additionally, in some embodiments, if data transfer management device 110 determines that the received request is not a request from the data domain, data transfer management device 110 may directly determine to use the CPU memory replication technology to transfer data associated with the request.

In the above example embodiment, by determining the target transfer technology for transferring a data block between the memory and the persistent memory at least according to the utilization rate of the central processing unit, an appropriate target transfer technology can be determined according to a current state of the central processing unit, so as to balance the CPU workload and data transfer delay, thereby improving the transfer performance of the data storage system.

Figure 4:
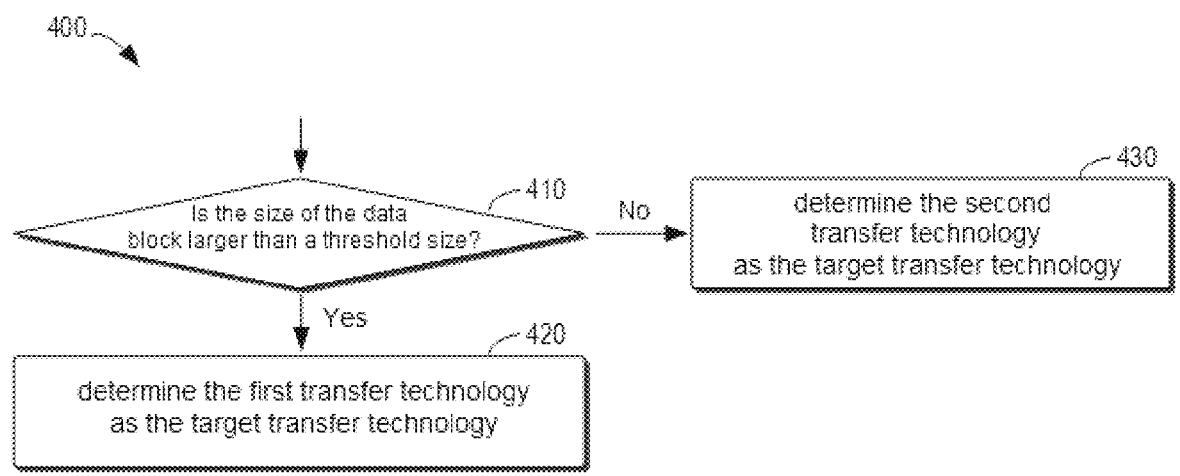
FIG. 4 illustrates a flowchart of a method for determining a target transfer technology according to an embodiment of the present disclosure.

FIG. 4 is a flowchart of method 400 for determining a target transfer technology according to an embodiment of the present disclosure. Method 400 is an embodiment of step 230 in method 200. For example, method 400 may be performed by data transfer management device 110 shown in FIG. 1. It should be understood that method 400 may also be performed by other devices, and the scope of the present disclosure is not limited in this regard. It should also be understood that method 400 may also include additional actions not shown and/or omit the actions shown, and the scope of the present disclosure is not limited in this regard.

At 410, data transfer management device 110 determines whether the size of the data block is larger than a threshold size.

In some embodiments, data transfer management device 110 may first obtain a threshold size, and then determine whether the size of data block 170 is larger than the threshold size. In some embodiments, the threshold size may be preset according to the hardware configuration of the data storage system, CPU performance, and/or size distribution of data blocks. For example, if the storage system has a relatively high-speed memory bus and a relatively high-performance CPU, a relatively high threshold size can be set to make full use of the performance of the CPU memory replication technology. Alternatively, in some embodiments, the threshold size may be pre-configured by the user. Additionally, in some embodiments, data transfer management device 110 may determine a threshold size suitable for the data storage system by reading a threshold size table, and the threshold size table may store preset threshold sizes for different data storage systems.

Figure 5A:
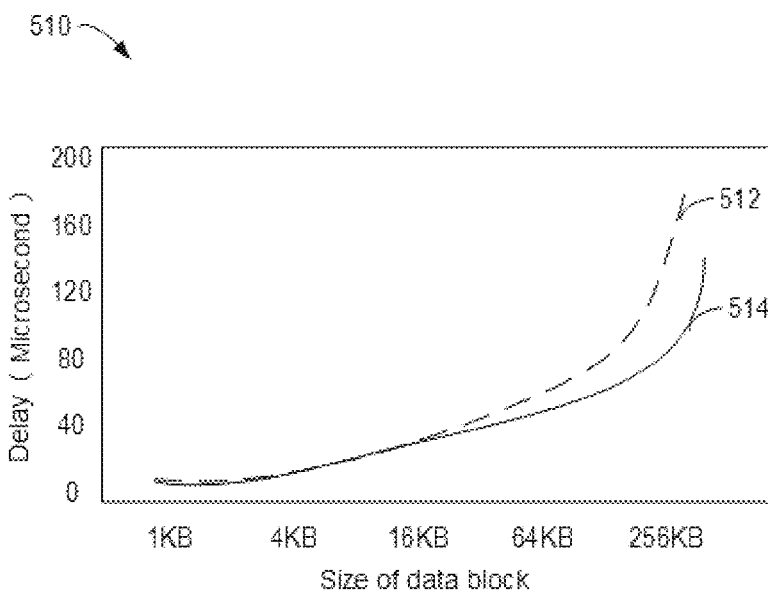
FIG. 5A illustrates a schematic diagram of changes in memory write delay with a size of a data block respectively corresponding to the first transfer technology and the second transfer technology according to an embodiment of the present disclosure.
Figure 5B:
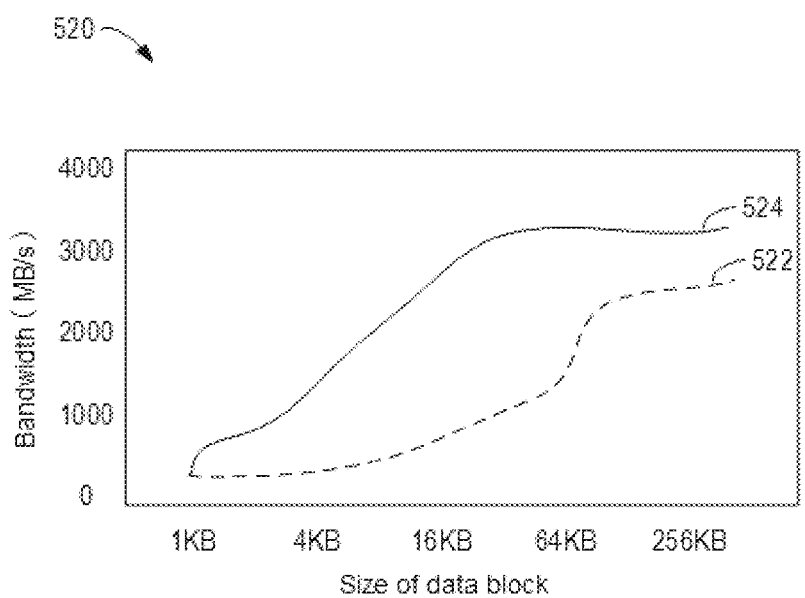
FIG. 5B illustrates a schematic diagram of changes in memory bandwidth with a size of a data block respectively corresponding to the first transfer technology and the second transfer technology according to an embodiment of the present disclosure.

In order to more clearly show the importance of the size of the data block, the following will describe the impact of applying different transfer technologies to data blocks of different sizes on system performance with reference to FIGS. 5A and 5B.

FIG. 5A illustrates schematic diagram 510 of changes in memory write delay with a size of a data block respectively corresponding to the first transfer technology and the second transfer technology according to an embodiment of the present disclosure. FIG. 5B illustrates schematic diagram 520 of changes in memory bandwidth with a size of a data block respectively corresponding to the first transfer technology and the second transfer technology according to an embodiment of the present disclosure.

FIGS. 5A and 5B show performance test results without page cache in a data storage system with dual-core Intel 3.46 GHz processor and 2 MB L2 cache. In FIG. 5A, dotted line 512 represents the change in memory write delay with the size of the data block corresponding to the CPU memory replication technology. Solid line 514 represents the change in memory write delay with the size of the data block corresponding to the I/O AT DMA technology. In FIG. 5B, dotted line 522 represents the change in memory bandwidth with the size of the data block corresponding to the CPU memory replication technology. Solid line 524 represents the change in memory bandwidth with the size of the data block corresponding to the I/O AT DMA technology. It can be seen from FIG. 5A that for data blocks larger than 16 KB in size, the I/O AT DMA technology has a lower write delay than the CPU memory replication technology does.

Table 2 below shows the size distribution of data blocks to be transferred in the storage system.

TABLE 2

Size distribution of data blocks to be transferred

| Size of data block | <32 KB | 32 KB-64 KB | >64 KB |
|---|---|---|---|
| percentage | 16.19% | 65.44% | 18.37% |

It can be seen from Table 2 that most of the data blocks are larger than 32 KB in size. Therefore, for example, by determining the threshold size as 32 KB and offloading the transfer of data blocks larger than the threshold size from the CPU through the I/O AT DMA technology, the CPU load can be effectively reduced, thereby improving system performance.

Therefore, if data transfer management device 110 determines that the size of the data block is higher than the threshold size, at 420, data transfer management device 110 determines the first transfer technology as the target transfer technology. In some embodiments, when the I/O AT DMA technology is determined as the target transfer technology, it uses parallel channels to transfer data. If data transfer management device 110 determines that the size of the data block is smaller than or equal to the threshold size, at 430, data transfer management device 110 determines the second transfer technology as the target transfer technology. In some embodiments, when the CPU memory replication technology is determined as the target transfer technology, it transfers data in a serial manner.

In the above example embodiment, by determining the target transfer technology according to the size of the data block, the I/O AT DMA technology can be effectively used to offload the CPU, thereby improving system performance.

Figure 6:
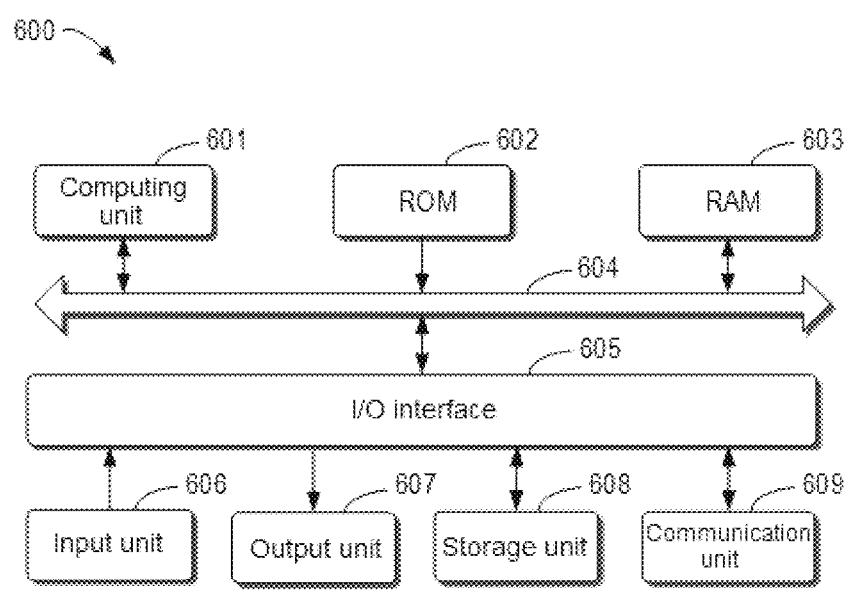
FIG. 6 is a schematic block diagram of an example device that can be configured to implement embodiments of the present disclosure.

FIG. 6 is a schematic block diagram of example device 600 that can be configured to implement an embodiment of the present disclosure. For example, data transfer management device 110 as shown in FIG. 1 can be implemented by device 600. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. In RAM 603, various programs and data required for the operation of device 600 may also be stored. CPU 601, ROM 602, and RAM 603 are connected to each other through bus 604. Input/output (I/O) interface 1005 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices over a computer network such as the Internet and/or various telecommunication networks.

The various processes and processing described above, such as methods 200 and 400, may be performed by processing apparatus 601. For example, in some embodiments, methods 200 and 400 may be implemented as a computer software program that is tangibly included in a machine-readable medium such as storage unit 608. In some embodiments, part or all of the computer program may be loaded and/or installed onto device 600 via ROM 602 and/or communication unit 609. When the computer program is loaded to RAM 603 and executed by CPU 601, one or more actions of methods 200 and 400 described above may be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that can retain and store instructions for use by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a raised structure in a groove having instructions stored thereon, and any suitable combination thereof. The computer-readable storage medium used here is not construed as transient signals per se, such as radio waves or other freely propagating electromagnetic waves, electromagnetic waves propagating through waveguides or other transfer media (for example, optical pulses through fiber-optic cables), or electrical signals transmitted through electrical wires.

The computer-readable program instructions described herein can be downloaded from a computer-readable storage medium to various computing/processing devices, or downloaded to an external computer or external storage device via a network such as the Internet, a local area network, a wide area network, and/or a wireless network. The network may include copper transfer cables, optical fiber transfer, wireless transfer, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages such as Smalltalk and C++ and conventional procedural programming languages such as "C" language or similar programming languages. The computer-readable program instructions may be executed entirely on a user computer, partly on a user computer, as a standalone software package, partly on a user computer and partly on a remote computer, or entirely on a remote computer or a server. In the case where a remote computer is involved, the remote computer can be connected to a user computer over any kind of networks, including a local area network (LAN) or a wide area network (WAN), or can be connected to an external computer (e.g., connected over the Internet using an Internet service provider). In some embodiments, an electronic circuit, such as a programmable logic circuit, a field programmable gate array (FPGA), or a programmable logic array (PLA), is customized by utilizing state information of the computer-readable program instructions. The electronic circuit may execute the computer-readable program instructions so as to implement various aspects of the present disclosure.

Various aspects of the present disclosure are described here with reference to flowcharts and/or block diagrams of the methods, the apparatuses (systems), and the computer program products according to the embodiments of the present disclosure. It should be understood that each block in the flowcharts and/or block diagrams as well as a combination of blocks in the flowcharts and/or block diagrams may be implemented by using computer-readable program instructions.

The computer-readable program instructions can be provided to a processing apparatus of a general purpose computer, a special purpose computer, or another programmable data processing apparatus to produce a machine, such that the instructions, when executed by the processing apparatus of the computer or another programmable data processing apparatus, generate an apparatus for implementing the functions/actions specified in one or more blocks in the flowcharts and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture that includes instructions for implementing various aspects of the functions/actions specified in one or more blocks in the flowcharts and/or block diagrams.

The computer-readable program instructions may also be loaded onto a computer, other programmable data processing apparatuses, or other devices, so that a series of operating steps are performed on the computer, other programmable data processing apparatuses, or other devices to produce a computer-implemented process, so that the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functionalities, and operations of possible implementations of the system, the method, and the computer program product according to a plurality of embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may actually be performed basically in parallel, or they may be performed in an opposite order sometimes, depending on the functions involved. It should be further noted that each block in the block diagrams and/or flowcharts as well as a combination of blocks in the block diagrams and/or flowcharts may be implemented by using a dedicated hardware-based system for executing specified functions or actions or by a combination of dedicated hardware and computer instructions.

The embodiments of the present disclosure have been described above. The above description is illustrative, rather than exhaustive, and is not limited to the disclosed embodiments. Numerous modifications and alterations are apparent to those of ordinary skill in the art without departing from the scope and spirit of the illustrated various embodiments. The selection of terms as used herein is intended to best explain the principles and practical applications of the various embodiments or technical improvements to technologies on the market, or to enable other persons of ordinary skill in the art to understand the embodiments disclosed herein.

The invention claimed is:

1. A method for managing data transfer, comprising:
if determining that a request to transfer a data block between a memory and a persistent memory of a data storage system is received, obtaining a utilization rate of a central processing unit of the data storage system, wherein the utilization rate is obtained through a data storage system bus; and
determining, from a first transfer technology and a second transfer technology and at least based on the utilization rate of the central processing unit, a target transfer technology for transferring a data block between the memory and the persistent memory, the first transfer technology transferring data through direct access to the memory, and the second transfer technology transferring data through the central processing unit, wherein determining the target transfer technology comprises if determining that the utilization rate is lower than a threshold utilization rate, determining the second transfer technology as the target transfer technology, wherein the first transfer technology is an input-output accelerated direct memory access technology, the input-output accelerated direct memory access technology using parallel channels to transfer data, and wherein the second transfer technology is a central processing unit memory replication technology, the central processing unit memory replication technology transferring data in a serial manner.

2. The method according to claim 1, wherein determining the target transfer technology further comprises:
if determining that the utilization rate is higher than or equal to the threshold utilization rate,
obtaining a size of the data block to be transferred, and determining the target transfer technology based on the size of the data block.

3. The method according to claim 2, wherein determining the target transfer technology based on the size of the data block comprises:
   if determining that the size of the data block is larger than a threshold size, determining the first transfer technology as the target transfer technology, wherein the threshold size is determined by reading a threshold size table storing a plurality of preset threshold sizes for different data storage systems; and
   if determining that the size of the data block is smaller than or equal to the threshold size, determining the second transfer technology as the target transfer technology.

4. The method according to claim 2, wherein the threshold size is preset based on at least one of a hardware configuration of the data storage system, central processing unit performance, and a size distribution of the data block.

5. The method according to claim 1, wherein the data storage system is a storage system for deduplication process comprising a data stream buffer and a slice.

6. The method according to claim 1, further comprising: in response to determining that the received request to transfer the data block between the memory and the persistent memory of the data storage system is not the request from a data domain, directly determining to use the central processing unit memory replication technology to transfer data associated with the request.

7. An electronic device, comprising:
   at least one processor; and
   at least one memory storing computer program instructions, the at least one memory and the computer program instructions being configured to cause, together with the at least one processor, the electronic device to perform actions comprising:
      if determining that a request to transfer a data block between a memory and a persistent memory of a data storage system is received, obtaining a utilization rate of a central processing unit of the data storage system, wherein the utilization rate is obtained through a data storage system bus; and
      determining, from a first transfer technology and a second transfer technology and at least based on the utilization rate of the central processing unit, a target transfer technology for transferring a data block between the at least one memory and the persistent memory, the first transfer technology transferring data through direct access to the at least one memory, and the second transfer technology transferring data through the central processing unit, wherein determining the target transfer technology comprises if determining that the utilization rate is lower than a threshold utilization rate, determining the second transfer technology as the target transfer technology, wherein the first transfer technology is an input-output accelerated direct memory access technology, the input-output accelerated direct memory access technology using parallel channels to transfer data, and wherein the second transfer technology is a central processing unit memory replication technology, the central processing unit memory replication technology transferring data in a serial manner.

8. The electronic device according to claim 7, wherein determining the target transfer technology further comprises:
   if determining that the utilization rate is higher than or equal to the threshold utilization rate,
      obtaining a size of the data block to be transferred, and
      determining the target transfer technology based on the size of the data block.

9. The electronic device according to claim 8, wherein determining the target transfer technology based on the size of the data block comprises:
   if determining that the size of the data block is larger than a threshold size, determining the first transfer technology as the target transfer technology, wherein the threshold size is determined by reading a threshold size table storing a plurality of preset threshold sizes for different data storage systems; and
   if determining that the size of the data block is smaller than or equal to the threshold size, determining the second transfer technology as the target transfer technology.

10. The electronic device according to claim 7, wherein the data storage system is a storage system for deduplication process comprising a data stream buffer and a slice.

11. A computer program product tangibly stored in a non-transitory computer storage medium and including machine-executable instructions, which when executed by a device, cause the device to perform actions, the actions comprising:
   if determining that a request to transfer a data block between a memory and a persistent memory of a data storage system is received, obtaining a utilization rate of a central processing unit of the data storage system, wherein the utilization rate is obtained through a data storage system bus; and
   determining, from a first transfer technology and a second transfer technology and at least based on the utilization rate of the central processing unit, a target transfer technology for transferring a data block between the memory and the persistent memory, the first transfer technology transferring data through direct access to the memory, and the second transfer technology transferring data through the central processing unit, wherein determining the target transfer technology comprises if determining that the utilization rate is lower than a threshold utilization rate, determining the second transfer technology as the target transfer technology, wherein the first transfer technology is an input-output accelerated direct memory access technology, the input-output accelerated direct memory access technology using parallel channels to transfer data, and wherein the second transfer technology is a central processing unit memory replication technology, the central processing unit memory replication technology transferring data in a serial manner.

12. The computer program product according to claim 11, wherein determining the target transfer technology further comprises; and
   if determining that the utilization rate is higher than or equal to the threshold utilization rate, obtaining a size of the data block to be transferred, and
   determining the target transfer technology based on the size of the data block.

13. The computer program product according to claim 12, wherein determining the target transfer technology based on the size of the data block comprises:
   if determining that the size of the data block is larger than a threshold size, determining the first transfer technology as the target transfer technology, wherein the threshold size is determined by reading a threshold size table storing a plurality of preset threshold sizes for different data storage systems; and if determining that the size of the data block is smaller than or equal to the threshold size, determining the second transfer technology as the target transfer technology.

14. The computer program product according to claim 11, wherein the data storage system is a storage system for deduplication process comprising a data stream buffer and a slice.

\* \* \* \* \*